United States Patent [19]

Vogt et al.

[11] Patent Number: 4,753,339

[45] Date of Patent: Jun. 28, 1988

[54] ACCUMULATING CONVEYOR OF THE LOW PRESSURE TYPE

[75] Inventors: Robert K. Vogt; Thomas C. Yu, both of Cincinnati, Ohio

[73] Assignee: The Buschman Company, Cincinnati, Ohio

[21] Appl. No.: 52,667

[22] Filed: May 20, 1987

[51] Int. Cl.$^4$ .......................................... B65G 13/071
[52] U.S. Cl. ..................................... 198/781; 198/790
[58] Field of Search .............................. 198/780–784, 198/788–791

[56] References Cited

U.S. PATENT DOCUMENTS

| | | | |
|---|---|---|---|
| 3,420,356 | 1/1969 | De Good | 198/781 |
| 4,174,777 | 11/1979 | Riehle | 198/781 |
| 4,266,659 | 5/1981 | Meyer et al. | 198/781 |
| 4,308,946 | 1/1982 | Ouellette | 198/790 |
| 4,345,684 | 8/1982 | Rolland | 198/781 |
| 4,502,593 | 3/1985 | van den Goor | 198/781 |

FOREIGN PATENT DOCUMENTS 3434092  3/1986 Fed. Rep. of Germany ...... 198/781

Primary Examiner—Robert J. Spar
Assistant Examiner—Lyle K. Kimms
Attorney, Agent, or Firm—Biebel, French & Nauman

[57] ABSTRACT

In a low pressure accumulator conveyor of the type where cartons are conveyed on a surface defined by successive freely rotatable rollers which are driven from beneath by frictional engagement with a continuous belt, the belt is held in periodically released driving engagement with the rollers by a plurality of vertically movable supporting assemblies, each of which includes a compound sheave wherein the bottom wall of the groove supporting the belt includes a major portion cylindrically curved about the rotational axis of the sheave, and a minor portion convexly curved about a radius which varies at a substantially uniform rate from a maximum at each end thereof equal to the radius of the major portion of the groove wall to a centrally located minimum less than that of a cam lobe on the sheave which thereby periodically disengages the belt from its associated carton-carrying roller.

7 Claims, 3 Drawing Sheets

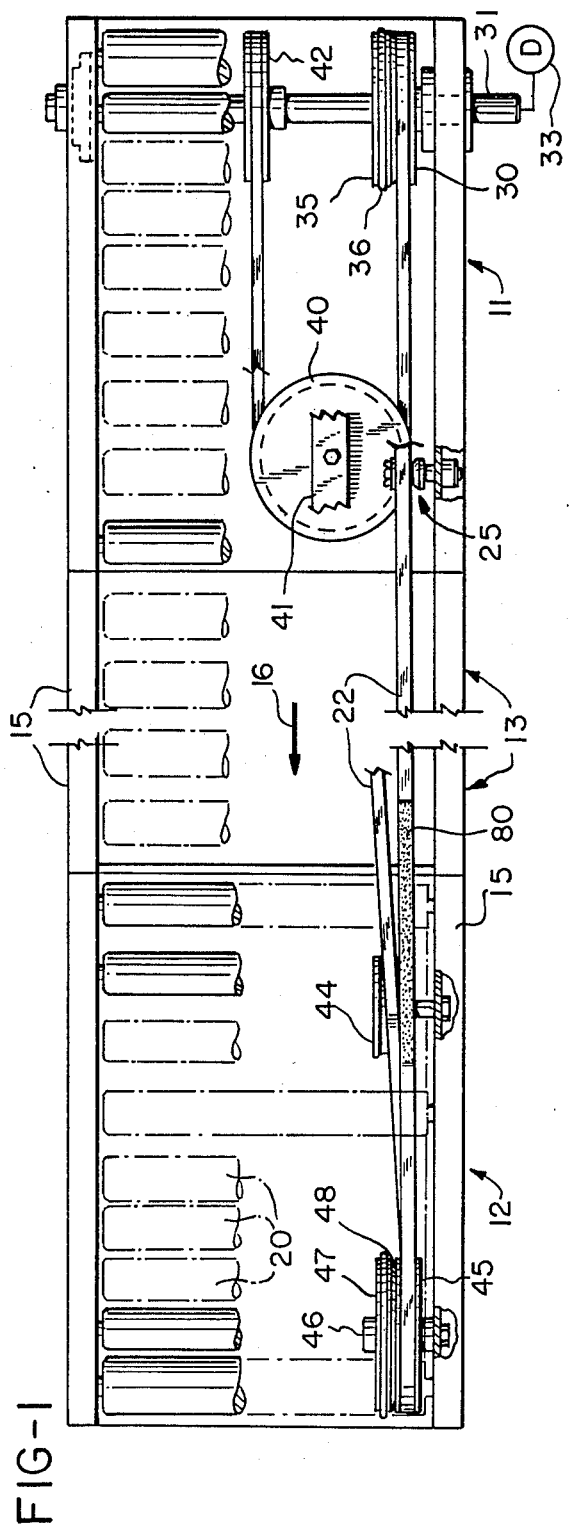
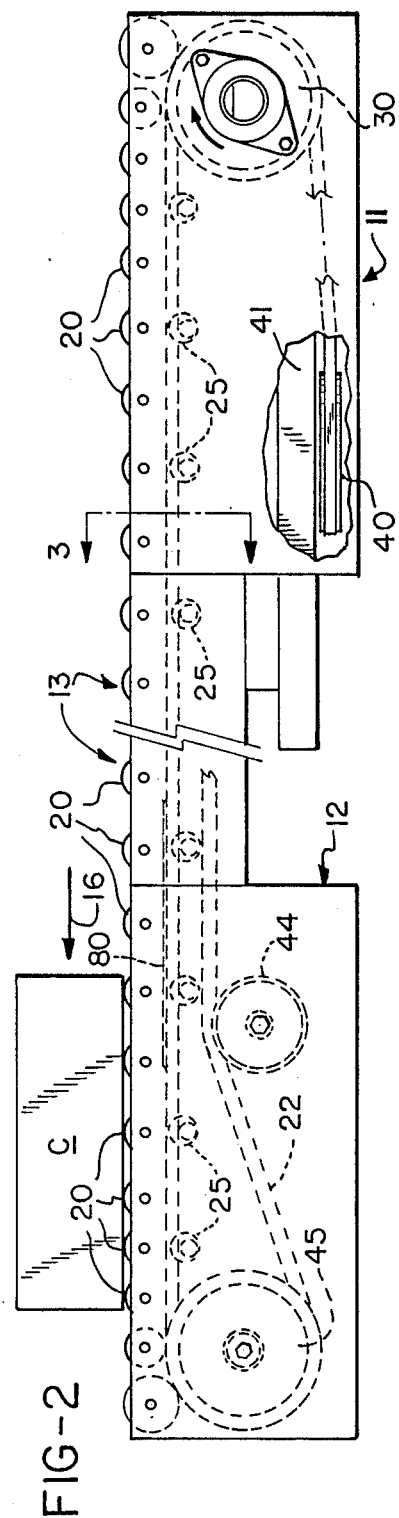

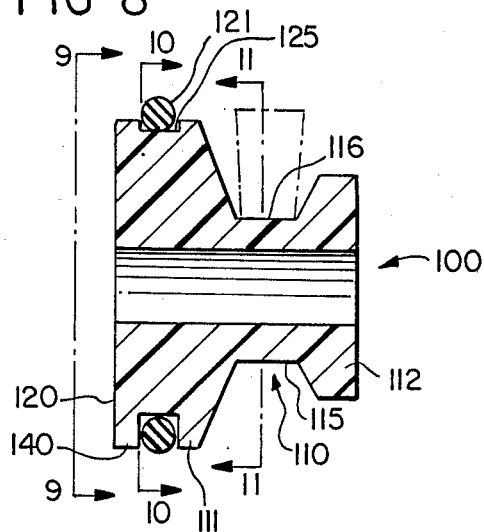
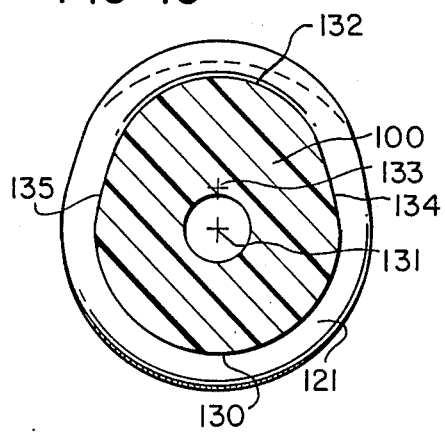
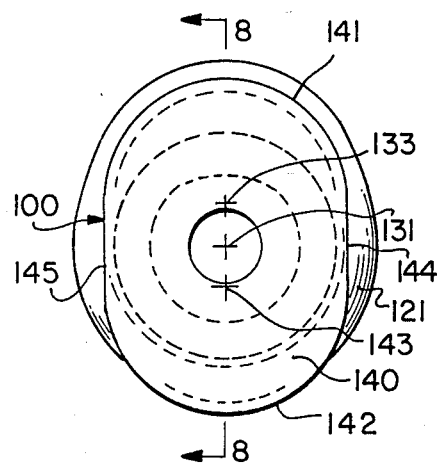
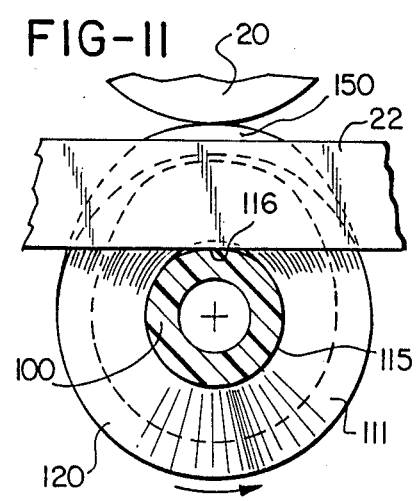

ACCUMULATING CONVEYOR OF THE LOW PRESSURE TYPE

BACKGROUND OF THE INVENTION

This invention relates to low pressure accumulator conveyors of the type where cartons or other successive articles are conveyed along a surface defined by successive freely rotatable rollers which are driven from beneath by frictional engagement with a continuous belt or cable, and more particularly to accummulator conveyors of this type wherein provision is made for minimizing the friction between the rollers and any carton resting thereon which is blocked from further forward movement.

Specific examples of conveyors operating in accordance with this general principle are shown, for example, in DeGood et al U.S. Pat. No. 3,253,697 of 1966, Forsythe et al U.S. Pat. No. 3,266,617 of 1966, DeGood U.S. Pat. No. 3,420,356 of 1969 and Bodewes et al U.S. Pat. No. 4,318,468 of 1982. The conveyor mechanisms disclosed in those patents vary in complexity and mode of operation, but all are characterized by a tendency to be relatively noisy and/or by objectionable vibration in operation.

SUMMARY OF THE INVENTION

The primary object of the invention is to provide a conveyor of the low pressure accumulator type which includes multiple freely rotatable rollers driven from beneath by frictional engagement with a continuously driven belt and wherein provision is made for reducing to a minimum the vibration and other noise effects incident to stoppage of the cartons on the conveyor while the driving belt continues to move.

This objective of the invention is accomplished by providing certain ones of the carrying rollers with belt-supporting assemblies wherein a compound sheave of special construction periodically moves the belt out of and into driving engagement with the associated roller in a continuous movement which minimizes shock, vibration or other noise effects incident thereto.

The particular construction and mode of operation by which the invention accomplishes this objective are explained in detail in the Description of the Preferred Embodiments of the invention which follows.

BRIEF DESCRIPTION OF THE DRAWINGS

FIG. 1 is a somewhat diagrammatic view in side elevation illustrating a conveyor embodying a form of the invention;

FIG. 2 is a plan view of the conveyor shown in FIG. 1;

FIG. 8 is a view in elevation similar to FIG. 5 and showing another form of compound sheave in accordance with the invention;

FIG. 9 is an end view looking from left to right in FIG. 8;

FIG. 10 is a section on the line 10—10 of FIG. 8; and

FIG. 11 is a section on the line 11—11 of FIG. 8.

DESCRIPTION OF THE PREFERRED EMBODIMENTS

Figure 3:
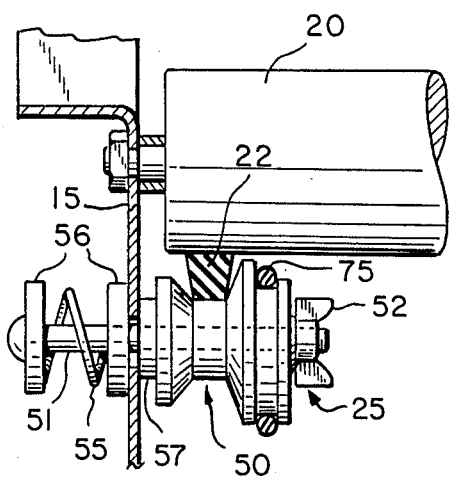
FIG. 3 is a section on the line 3—3 of FIG. 1, but on a larger scale, and showing the driving belt in engagement with the roller.

The conveyor shown in FIGS. 1 and 2 includes a drive section 11 at its upstream end, an idler section 12 at its downstream end, and one or more intermediate sections 13, the frame means of each of these sections being indicated generally at 15. In operation, successive cartons C travel from right to left in FIGS. 1-2, as indicated by arrows 16, along a conveying surface defined by multiple rollers 20 which are mounted for free rotation in frame means 15 and are driven from beneath by frictional driving engagement with a belt or cable, shown as a V-belt 22.

The upper run of belt 22 is supported in releasable driving engagement with the rollers 20 by a plurality of sub-assemblies identified generally as 25. One of these units 25 is shown as mounted in the frame 15 below every alternate roller 20, but this is a matter of choice in that a unit 25 could be mounted below each roller 20 or at greater intervals than every other roller 26. The drive for the belt 22 in drive section 11 includes a driving pulley 30 on a shaft 31 which is directly driven by an electric motor or other drive as indicated at 33. A sheave 35 on shaft 31, which may be a part of the pulley 30, carries an O-ring tire 36 that has a slightly larger outer diameter than the portion of belt 22 wrapping pulley 30 and is in constant driving engagement with the first two rollers 20 at the upstream end of drive section 11.

As viewed in FIG. 1, the drive shaft 31 rotates clockwise, and the belt 22 wraps pulley 30 and then travels around a tensioning pulley 40 having a mounting 41 which is adjustable lengthwise of the frame for belt-tensioning purposes. From pulley 40, the belt 22 travels around an idler pulley 42 on drive shaft 31, from which the return run of the belt travels over an idler pulley 44 at the downstream end of the conveyor to an idler sheave 45 on a stub shaft 46 mounted in the frame 15 of conveyor section 12. The idler sheave 45 includes a portion 47 which carries an O-ring tire 48 for driving the last two rollers 20 in the idler section 12, in the same manner as the sheave 35 and O-ring tire 36 drive the first two rollers in the drive section 11.

One of the releasable supporting assemblies 25 for the upper run of the belt 22 is shown in detail in FIGS. 3-6. Its major component is a compound sheave 50 mounted for free rotation on a shaft 51, which is shown as a carriage bolt that extends freely through the front side of the frame 15 and is provided at its inner end with a wing nut 52. The outer end of the shaft 51 is biased outwardly of the frame by a coil spring 55 supported between a pair of cup washers 56, thereby continuously biasing the shaft 51 toward horizontal position, and a washer 57 on shaft 51 between sheave 50 and frame 15 locates the sheave on shaft 51.

The compound sheave 50 includes a flat-bottomed V-groove 60 which is of slightly larger proportions than the belt 22 to assure friction-free passage of the belt therethrough whenever sheave 50 is held against rotation while the belt is being driven. For the same reason, the sheave 50 is preferably formed of a plastic having low coefficient of friction and self-lubricating properties, such as ultra high molecular weight polyethylene.

The outer end wall 61 of groove 60 is of smaller diameter than the opposite end wall 62 to facilitate insertion of the belt 22 in groove 60 in setting the conveyor up for operation.

The bottom wall of groove 60 includes a portion 65 which is cylindrically curved about the central axis 64 of the sheave assembly 50, which is also the central axis of the shaft 51. This cylindrically curved portion 65 of the bottom wall of groove 60 has a substantially greater angular extent than 180°, preferred results having been obtained if this wall portion 65 has an angular dimension of 220° as further explained below.

The remaining minor portion 66 of the bottom wall of groove 60 is convexly curved to a contour and radial section which has a radial dimension from the axis 64 that varies from a minimum at the center thereof to a maximum at each end thereof equal to the radius of the wall portion 65. The major objective of the invention is to provide the wall portion 66 with a contour which varies without any sharp or flat portions between its minimum and maximum radial dimensions, so that ideally, the radial dimension of wall portion 66 should vary at an infinite rate between its maximum and minimum limits. For practical purposes, however, highly satisfactory results are obtained if this radial dimension varies in sufficiently small angular increments of the wall portion 66 to constitute a rate of radius change which is substantially uniform.

As a specific example of satisfactory such dimensions, the maximum diameter of the wall portion 65 may be 0.750 inch, providing a maximum radius of 0.375 inch. A satisfactory contour for the wall portion 66 may then be obtained by reducing the radius thereof, from the same center 64 as wall portion 65, from both ends thereof over a total range of 140° in 10° increments to a minimum of 0.3312 inch at its center in accordance with the following table in fractions of an inch:

| Degrees from Center | Radius | Cam Drop |
| --- | --- | --- |
| 0 | .3312 | .0438 |
| 10 | .3332 | .0418 |
| 20 | .3396 | .0354 |
| 30 | .3444 | .0306 |
| 40 | .3528 | .0222 |
| 50 | .3607 | .0143 |
| 60 | .3695 | .0055 |
| 70 | .3750 | .0000 |

The compound sheave 50 also includes a portion 70 which projects axially beyond groove end wall 62 and is eccentric with respect to the groove 60 by being cylindrically curved about an axis 72 that is offset from the groove axis 64 in the direction of the center of the minor portion 66 of the bottom wall of groove 60. This portion 70 of the sheave 50 is provided with a peripheral groove 74 for receiving an O-ring tire 75, and these parts are so proportioned that the tire 75 will define a cam lobe which is in radially overlying and axially centered relation with the minor portion 66 of the bottom wall of groove 60.

Figure 7:
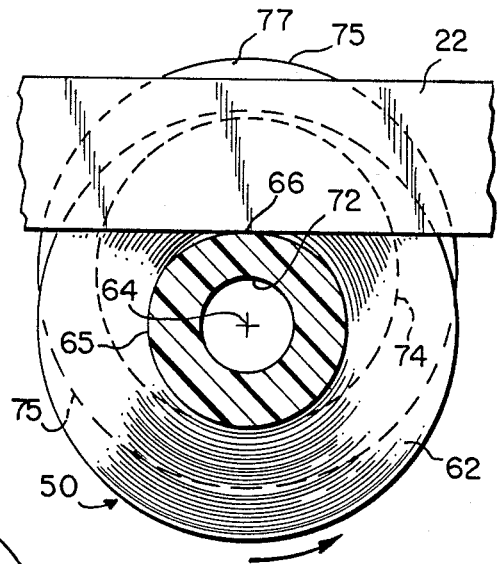
FIG. 7 is a section on the line 7—7 in FIG. 4.
Figure 6:
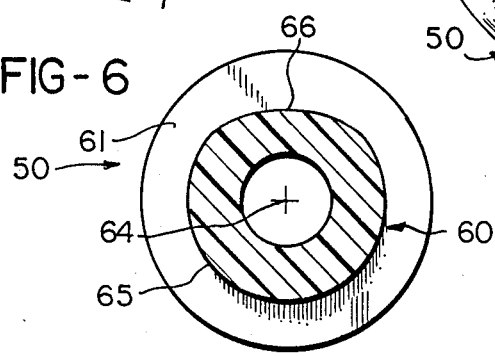
FIG. 6 is a section on the line 6—6 of FIG. 5.

More specifically, when a belt 22 of the proper thickness (measured radially of sheave 50) is riding in the groove 60, the cam lobe portion of the tire 75 should have a greater radial dimension from the sheave axis 64 than the portion of belt 22 engaging the portion 66 of the bottom wall of groove 60, as illustrated in FIG. 7 wherein the lobe portion of tire 75 is identified as 77. In other words, the cam lobe 77 will have an outer radial dimension from the sheave axis 64 which varies from a maximum that coincides in angular position on the compound sheave 50 with the minimum radial dimension of groove wall portion 66 and is greater than the sum of that minimum radial dimension added to the thickness of the belt.

The radial dimension of the lobe portion 77 will reach zero at each end thereof, where the radial dimension of the tire 75 from the sheave axis 64 will equal and then decrease below the sum of the thickness of the belt 22 and the radius of the major portion 65 of the bottom wall of groove 60. Over the remainder of its circumference, the radial distance of the outer periphery of tire 75 to the sheave axis 64 will decrease to a minimum at the point which is diametrically opposite the center of the minor portion 66 of the bottom wall of groove 60. Thus the belt 22 will project radially beyond the tire 75 whenever the belt is riding on the major portion 65 of the bottom wall of groove 60.

As an example of satisfactory dimensions for the other portions of sheave assembly 50 where the belt 22 is 0.50 inch thick and the groove 60 has the dimensions listed above, the groove 74 may have a radius of 0.578 inch with its center 72 offset by 0.187 inch from the sheave axis 64, and the O-ring tire 75 may have a cross-sectional diameter of 3/16 inch. Thus the maximum radial projection of the cam lobe portion 77 of tire 75 beyond belt 22 will coincide with the center of groove wall portion 66 and will be approximately 0.122 inch, and this projection will decrease to zero over about 45° of angular movement on each side of the center of lobe portion 77.

Whenever the conveyor is in continuous operation, with no carton blocked from traveling thereon, the continuously driven belt 22 will cause all of the sheave assemblies 50 to rotate continuously. Therefore, since the springs 55 will bias all of the shafts 51 to horizontal position, the belt 22 will be biased into driving engagement with all the rollers 20 so that the latter will continue to move cartons along the conveyor.

As each spindle assembly 50 makes a complete revolution, it will hold the belt 22 in driving engagement with the roller 20 thereabove through approximately 270° of its rotation, but during the remaining 90°, the tire 75 thereon will engage the roller 20 and thereby cause the shaft 51 to be depressed against the biasing action of spring 55 until the cam lobe portion 77 of the tire has completed its engagement with the roller 20. During that interval, the belt 22 will therefore drop out of engagement with the roller 20, but this action will be only momentary, and the driving action of the belt on roller 20 will be resumed as soon as the cam lobe 77 has rotated out of engagement with the roller 20.

Figure 4:
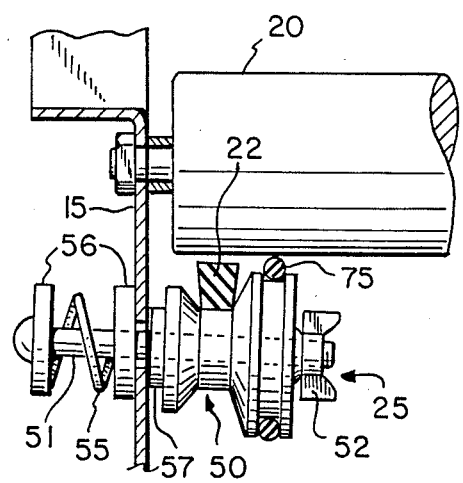
FIG. 4 is a view similar to FIG. 3 showing the driving belt disengaged from the roller.
Figure 5:
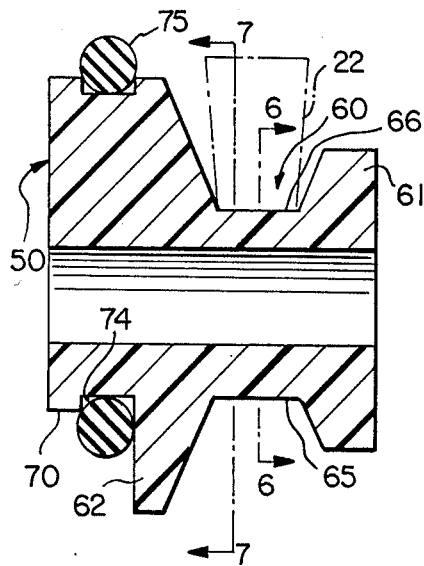
FIG. 5 is a detail view of the compound sheave shown in FIG. 3, the view being in section on the line 5—5 of FIG. 6.

These two positions—driving and disengaged—of the belt 22 are illustrated in FIGS. 3 and 4. It will now be understood from the foregoing explanation that with the sheave assembly 50 and its associated parts dimensioned as listed, the total vertical movement of the portion of the spindle assembly carrying the tire 75 will be only approximately 0.122 inch, and since the tire is located on the opposite side of the groove 60 from the frame part 15 in which the shaft 15 is mounted, the vertical movement of the belt 22 will be correspondingly less.

The proportions and configuration of the portion 66 of the bottom wall of groove 60 are of the greatest importance in achieving the purpose of the invention with respect to minimizing vibration effects and related noise resulting from movement of the belt 22 out of and back into engagement with the rollers 20.

Thus referring to FIG. 7, wherein the belt 22 is moving to the left and rotating the sheave assembly 50 counterclockwise, the movement of belt 22 out of engagement with roller 20 began as the left-hand leading end of groove wall portion 66 passed the 12 o'clock position of the sheave 50. Then as the belt settled smoothly into the following portion of groove wall portion 66, it moved out of engagement with roller 20 as the center of wall portion 66 moved toward the 12 o'clock position of the sheave assembly and approximately 45° therepast, after which the belt 22 again moved up into driving engagement with roller 20 until the leading end of the wall portion 66 again passed through the 12 o'clock position of the sheave 50.

With the rollers 20 and sheaves 50 of the dimensions listed above, this action will take place approximately 2.5 times during each complete revolution of a roller 20 having a belt-supporting assembly 25 cooperating therewith. In other words, for each one foot of movement of the belt 22 past a roller 20, the associated compound sheave 50 will make approximately five revolutions and will cause the belt to separate from and then reengage the roller 20 five times. However, with the minor portion 66 of the groove wall 60 configured as described, these movements of the belt will create no appreciable vibration or other noise, because the belt will move so smoothly, and without flexing, over the groove wall portion 66 that it will reengage the roller 20 with no detectable shock.

In theory, if the sheave 50 is driven at constant speed by the belt 22, then when the tire 75 engages the roller 20 and causes disengagement therefrom of the belt 22, there would be a tendency for the tire 75 to accelerate the rotational speed of the roller 20 up to the high point of lobe portion 77, because lobe 77 has a greater radial dimension from the sheave axis 64 than the corresponding radial dimension of belt 22 when it is riding on the major portion 65 of the bottom wall of groove 60, and has therefore a correspondingly higher peripheral speed.

In practice, however, the rotational speed of the rollers 20 is held essentially constant by the load of the cartons traveling thereover, so that instead of their being speeded up by the tire lobe portions 77, the reverse action will take place, and the rotational speed of each sheave 50 will be prevented from accelerating during the interval of engagement of the cam lobe 77 with its associated roller 20, accompanied by whatever slippage may be needed between the belt 22 and groove wall portion 66. These cooperative actions will further contribute to the smoothness of operation and freedom from vibration which characterize the conveyor of the invention.

Whenever a carton is blocked from forward progress on the conveyor, the driving engagement of the belt 22 with the rollers 20 is interrupted until the carton is released. More specifically, when a carton is blocked against forward movement, the friction between the bottom of the carton and the rollers 20 on which it is resting will tend to hold those rollers against rotation.

The resulting action of the spindle assembly under each of these stopped rollers is illustrated in FIGS. 3 and 4. When the roller 20 is stopped from rotation by a stationary carton resting thereon, the belt will rotate the associated spindle 50 until engagement between the cam lobe 77 thereon and the roller 20 effects separation of the belt from the roller as shown in FIG. 4, and also stops the sheave from rotating. The belt will continue to move, but it will simply slide along the minor portion 66 of the bottom wall of groove 60 rather than causing the spindle assembly to continue rotating. Also, the length of belt between adjacent sheaves will drop sufficiently to disengage from the roller thereabove.

In order to start the cartons moving again after whatever has stopped their progress has been released, the belt 22 is provided with exciter pads 80 at spaced intervals (e.g. 12 feet or more) along its outer surface which are slightly thicker than the maximum radial projection of the cam lobe portion 77 of tire 75 above the belt in the 12 o'clock position of the sheave assembly 50.

For example, where the latter dimension is approximately 0.122 inch as stated above, each exciter pad 80 may be 0.125 inch thick and one foot long, with two-inch beveled blending portions at each end, for an installation wherein the rollers 20 are 1.9 inches in diameter and are spaced along the conveyor frame on three-inch centers. When the cartons are free to move, but are still stationary, then as an exciter pad 80 passes under the rollers 20 on which the leading carton is resting, it will not only cause each of those rollers to rotate, but it will at the same time rotate their associated sheaves 50 out of their stopped positions, and thus start the whole train of cartons moving.

It is of course apparent that the exciter pads 80 will also move between each stopped sheave 50 and its associated roller 20 on which a stopped carton is resting. As a result, both the roller and the sheave will be caused to rotate, but only so long as an exciter pad is between them, and with the pads and rollers of the dimensions stated, this will mean that each roller will turn only twice before the exciter pad has moved therepast. Further, even if these exciter pads are spaced as close to each other as 12 feet, at any single instant, only a very small minority of the rollers 20 will be forced to turn, so that the total friction between rollers 20 with respect to stopped cartons resting thereon will be correspondingly very small.

FIGS. 8-11 show a modified form of compound sheave 100 which will operate in essentially the same manner as described above in connection with the compound sheave 50. The sheave 100 includes a flat-bottomed V-groove 110 for drive belt 22 having end walls 111 and 112, and a bottom wall having a cylindrically curved major portion 115 and a minor cam portion 116, all of which portions may be of the same dimensions as stated above for the groove 60. It is at its other end that the sheave 100 differs from sheave 50.

More specifically, the portion 120 of the sheave 100 which carries the O-ring tire 121 is of a compound shape that provides the desired cam lobe portion of tire 121 without giving the appearance of eccentricity of the sheave 50 and its eccentric portion 70. As best shown in FIGS. 9 and 10, the groove 125 which carries the tire 121 has a bottom wall composed of four different portions, a major portion 130 which is cylindrically curved about the central axis 131 of the sheave 100, a minor portion 132 which is cylindrically curved about an axis 133 located eccentrically with respect to axis 131, and two short flat portions 135 which extend between and are tangential to the ends of the cylindrical portions 130 and 132.

The outer end wall 140 of the groove 125 is of a different compound shape to facilitate mounting and replacing the tire 121 in groove 125. More specifically, this wall includes a portion 141 which is semi-cylindrical about the same axis 133 as the groove wall portion 132, a second semi-cylindrical portion 142 having its axis 143 equispaced on the opposite side of sheave axis 131 from the axis 133, and flat portions 144 and 145 connecting the semi-cylindrical portions 141 and 142.

The result, as best illustrated in FIGS. 9 and 10, is to provide the groove 125 with a varying depth such that at the center of wall portion 141, the tire 121 is enclosed within the groove, but at the center of wall portion 140, the tire projects outwardly of the groove and radially beyond the belt 22 to provide the desired cam lobe portion 150. At the same time, however, the end wall 140 of groove 125 is symmetrically located with respect to the adjacent end wall 111 of groove 110 and has the same major diametral dimension, thereby avoiding the appearance of eccentricity of the compound sheave 50 in operation.

As already noted, in a satisfactory embodiment of the sheave 100, all of the dimensions relating to the parts defining the groove 110 for the belt 22 may be the same as described above for the sheave 50. The bottom wall of the groove 125 for the tire 121 may then be composed of a major portion 130 having a radius of 0.625 inch and an angular extent of 209°, while the minor portion 132 has a radius of 0.578 inch and an angular extent of 151°, with its axis 133 spaced 0.187 inch from the sheave axis 131. The flat portions 135 of the groove wall may then be drawn tangent to the ends of both of the cylindrically curved portions 130 and 132.

The end wall 140 of the groove 125 may then have each of its semi-cylindrical portions 141 and 142 curved about the same radius of 0.625 inch, but with their respective axes spaced 0.187 inch on each side of the sheave axis 131, which will provide the wall 140 with its maximum diametral dimension equal to the diameter of the belt groove wall 111. The flat portions 144 and 145 of wall 140 will then be each of a length of 0.375 inch, and the minimum diametral dimension of wall 140 will be 1.25 inches, which will coincide with points on the major portion 130 of groove 125. Thus the groove 125 will be in effect two half-grooves, or rather its wall 140 will be composed of two half-sections, thereby greatly facilitating mounting the tire 121 therein.

The operation of this embodiment of the invention will be essentially the same as the operation described above in connection with FIGS. 3–7. As is apparent from FIGS. 8 and 11, when the minor portion 116 of the bottom wall of groove 120 is in its 12 o'clock position, the cam lobe portion 150 of the O-ring tire 121 will extend above the belt 22 and thereby move the sheave 100 away from its associated roller 20. Further, this movement of the sheave out of and back into its position wherein the belt 22 is in driving engagement with the associated roller will be as smooth and vibration-free as described in connection with FIGS. 3–7. At the same time, since the portion 120 of the sheave 100 is more nearly symmetrical with that portion of the sheave defining the groove 110, this also will minimize the development of vibration or pulsing which could contribute to the development of noise around the installation.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In an accumulating conveyor including a frame supporting a plurality of freely rotatable rollers defining a conveying surface for successive articles, an endless belt of a predetermined radial thickness mounted in the frame below said rollers and including an upper run adapted for frictional driving engagement with said rollers from below, and means for driving said belt, the combination of a plurality of individual assemblies for effecting controlled driving engagement of said belt with said rollers and disengagement of said belt from said rollers, each of said assemblies comprising:

(a) a shaft mounted in said frame below and in substantially parallel alignment with one of said rollers by mounting means providing for movement of said shaft toward and away from said one roller,
   (b) a compound sheave rotatably mounted on said shaft and having therein a circumferential groove including a bottom wall proportioned to receive and support said upper run of said belt,
   (c) said groove wall being cylindrically curved about the central axis of said shaft over the major angular portion thereof but having a minor portion which is convexly curved to a contour in radial section of a radial dimension from said shaft axis that varies from a minimum at the center thereof to a maximum at each end thereof equal to the radius of said major portion of said groove wall,
   (d) yieldable means biasing said shaft toward said one roller to effect driving engagement of said belt run with said one roller,
   (e) said compound sheave also including means defining a convexly curved cam lobe adjacent and parallel with said groove and in axially centered relation with said minor portion of said groove wall, and
   (f) said cam lobe having an outer radial dimension from the rotational axis of said compound sheave which varies from a maximum, that coincides in angular position on said sheave with said minimum radial dimension of said minor portion of said groove wall and is greater than the sum of said belt thickness and said minimum radial dimension of said minor portion of said groove wall, to a minimum that is less than the sum of said belt thickness and the radius of said major portion of said groove wall,
   (g) whereby as said minor portion of said groove wall rotates through the 12 o'clock position thereof, said cam lobe will cause said belt to move out of and then back into engagement with said one roller.

2. The combination defined in claim 1 wherein said minor portion of said groove wall is convexly curved about the same axis as said major portion and has a radius which decreases at a substantially uniform rate from each end thereof to the center thereof.

3. The combination defined in claim 1 wherein said cam lobe is a portion of a cylindrically curved cam having its axis located eccentrically with respect to the rotational axis of said compound sheave and on the same side of said sheave axis as the center of said minor portion of said groove wall.

4. The combination defined in claim 1 wherein said cam lobe is a portion of an elastomeric O-ring retained in a groove in said sheave, said groove having a bottom wall comprising a major portion which is cylindrically curved about the rotational axis of said compound sheave and a minor portion which is cylindrically curved about a shorter radius than said major portion having its axis located eccentrically with respect to said sheave axis on the same side of said sheave axis as the center of said minor portion of said belt groove wall.

5. The combination defined in claim 4 wherein the outer wall of said O-ring groove is oblong as viewed axially of said sheave, and the major diametral dimension thereof coincides with the adjacent end wall of said belt groove.

6. The combination defined in claim 1 characterized by the fact that said sheave is formed of a material having low coefficient of friction and self-lubricating properties.

7. The combination defined in claim 6 wherein said sheave is formed of ultra high molecular weight polyethylene.

* * * * *